United States Patent [19]
Alphen

[11] 3,939,339
[45] Feb. 17, 1976

[54] LIGHTING SYSTEM FOR A MOTORCYCLE

[76] Inventor: Jacques M. Alphen, 67, Allée Jules Verne, 92 La Celle Saint-Cloud, France

[22] Filed: Mar. 28, 1974

[21] Appl. No.: 455,757

[30] Foreign Application Priority Data
Apr. 2, 1973 France .............................. 73.11767

[52] U.S. Cl. ................................ 240/62.2; 240/62.4
[51] Int. Cl.² ............................................ B60Q 1/10
[58] Field of Search...... 240/7.55, 8.25, 62 R, 62 A, 240/62 B, 62 H, 62.1, 62.2, 62.3, 62.4, 62.51, 62.61, 62.71

[56] References Cited
UNITED STATES PATENTS

| | | | |
|---|---|---|---|
| 1,009,973 | 11/1911 | Kaufman | 240/62.2 |
| 1,360,841 | 11/1920 | Whiting | 240/62.2 |
| 1,507,203 | 9/1924 | Redding | 240/62.2 |
| 1,593,075 | 7/1926 | Hensley | 240/62.2 |
| 1,635,393 | 7/1927 | Amans | 240/62.2 |
| 2,335,676 | 11/1943 | Humphrey | 240/7.55 |
| 2,474,610 | 6/1949 | Wunsch | 240/62.2 |
| 3,099,400 | 7/1963 | Holmes | 240/7.55 |
| 3,385,961 | 5/1968 | Lemberger | 240/62.2 X |
| 3,634,677 | 1/1972 | Stuttgart et al. | 240/62.4 X |

*Primary Examiner*—L. T. Hix
*Assistant Examiner*—Alan Mathews
*Attorney, Agent, or Firm*—Alan H. Levine

[57] ABSTRACT

A system for correction of the orientation of a motor cycle headlamp includes a weight which moves in dependence on the centrifugal force caused by a turning movement of the motor cycle. In one embodiment, the weight is mechanically linked by transmission chains to control the correcting movement of the headlamp. In another embodiment, the correcting movement is carried out electrically under the control of a transducer which senses the extent of movement of the weight.

18 Claims, 9 Drawing Figures

LIGHTING SYSTEM FOR A MOTORCYCLE

BACKGROUND OF THE INVENTION

This invention relates to a lighting system for a motor cycle or other similar two-wheeled vehicle. When a motor cycle makes a turn, there is a substantial deterioration in the illumination provided by a standard headlamp, the deterioration magnifying in dependence upon the speed in which the turn is made. This is principally due to the fact that during a turn the cycle is physically tilted to compensate for the centrifugal force due to the turn. Such tilting causes the headlamp to be tilted and, as a consequence, the beam is tilted as well. Moreover, the attitude of the cycle as a whole varies slightly due to the centrifugal force affecting the suspension of the cycle.

SUMMARY OF THE INVENTION

A principal object of the invention is the provision of means by which the headlamp of a motor cycle or the like has its orientation corrected to an appropriate extent as the vehicle makes a turn in one direction or the other.

In accordance with the invention, a system for the automatic correction of the orientation of the beam of light of the headlamp of a motor cycle or similar vehicle comprises means for turning at least the optical system of the headlamp about an axis of rotation adjacent the optical axis, and a transducer detector system adapted to detect the angle of inclination of the vehicle while turning, and means for turning the optical system of the headlamp being controlled by the transducer detector in such a manner that a compensating orientation variation is applied to the headlamp beam when the vehicle makes a turn.

The axis of rotation is preferably situated in the central fore and aft plane of the headlamp and is slightly inclined forwardly and downwardly in relation to the generally horizontal optical axis.

The means for turning the optical system of the headlamp may comprise a guide ring mounted outside the headlamp reflector perpendicularly to the axis of rotation and cooperating with fixed counterpart elements, and a driving toothed ring coaxial with the first ring.

Conveniently, the transducer detector system comprises a weight capable of moving under the effect of centrifugal force and acting directly on a counteracting spring system, and means may be provided to hold the weight in a top position at times when a correction of the orientation of the beam of light is not required.

A mechanical transmission may be provided comprising at least one rack secured to the weight and forming the output member of the transducer. Two racks may be provided each of which continuously cooperates with a transmission chain terminating in a gearwheel adapted to cooperate with the driving toothed ring, and means is provided for selective disengagement of one of the two transmission chains when the vehicle makes a turn. In this case, the selective disengagement means may comprise a first circular cam track which is fixed with respect to the vehicle frame, the center of the circular cam track lying on the axis of rotation of a vehicle fork relatively to said frame, said cam track cooperating with rollers associated with each of the two transmission chains.

Alternatively, in an electrical system, the transducer detector system is associated with a potentiometer detector the state of which provides a potentiometer value characteristic of the detected centrifugal force, and the rotary drive means comprise an electric motor whose travel in relation to a mean position is a function of the said potentiometer value. The motor is preferably a reversible d.c. motor, the direction of rotation of which is determined in dependence on the direction in which the motorcycle handlebar turns. In this case, the reversible motor may be associated with a second reference potentiometer which it drives with it, and the motor is fed by means of an electric circuit including the detector potentiometer and the reference potentiometer as long as the two potentiometers are not in equilibrium in the said circuit.

In the light of the above definition, the following remarks should be made:

Where reference is made herein and in the claims to means for turning at least the optical system of the headlamp it must be understood as meaning at least the reflector and the associated lamp and, possibly, the optical deflectors generally borne by the lens, and it should also be understood that the headlamp assembly comprising both an optical system and a shell may also be turned;

Generally, the said axis of rotation will be slightly inclined downwardly and forwardly in relation to the optical axis of the headlamp, the angle of inclination being, for example, less than 15°. Experiment has shown and calculations have confirmed that such an inclination gives optimum compensation of the beam in the case of motor-cycles generally available on the market today. However, other inclinations are possible in specific cases without thereby departing from the scope of the invention.

DESCRIPTION OF THE DRAWINGS

The invention may be carried into practice in various ways but two specific embodiments will now be described by way of example with reference to the accompanying drawings, in which.

DESCRIPTION OF THE PREFERRED EMBODIMENTS

It may be generally stated that the lighting of all such vehicles deteriorates when the vehicle makes a turn, and such deterioration increases with the speed at which the turn is made.

Figure 1:
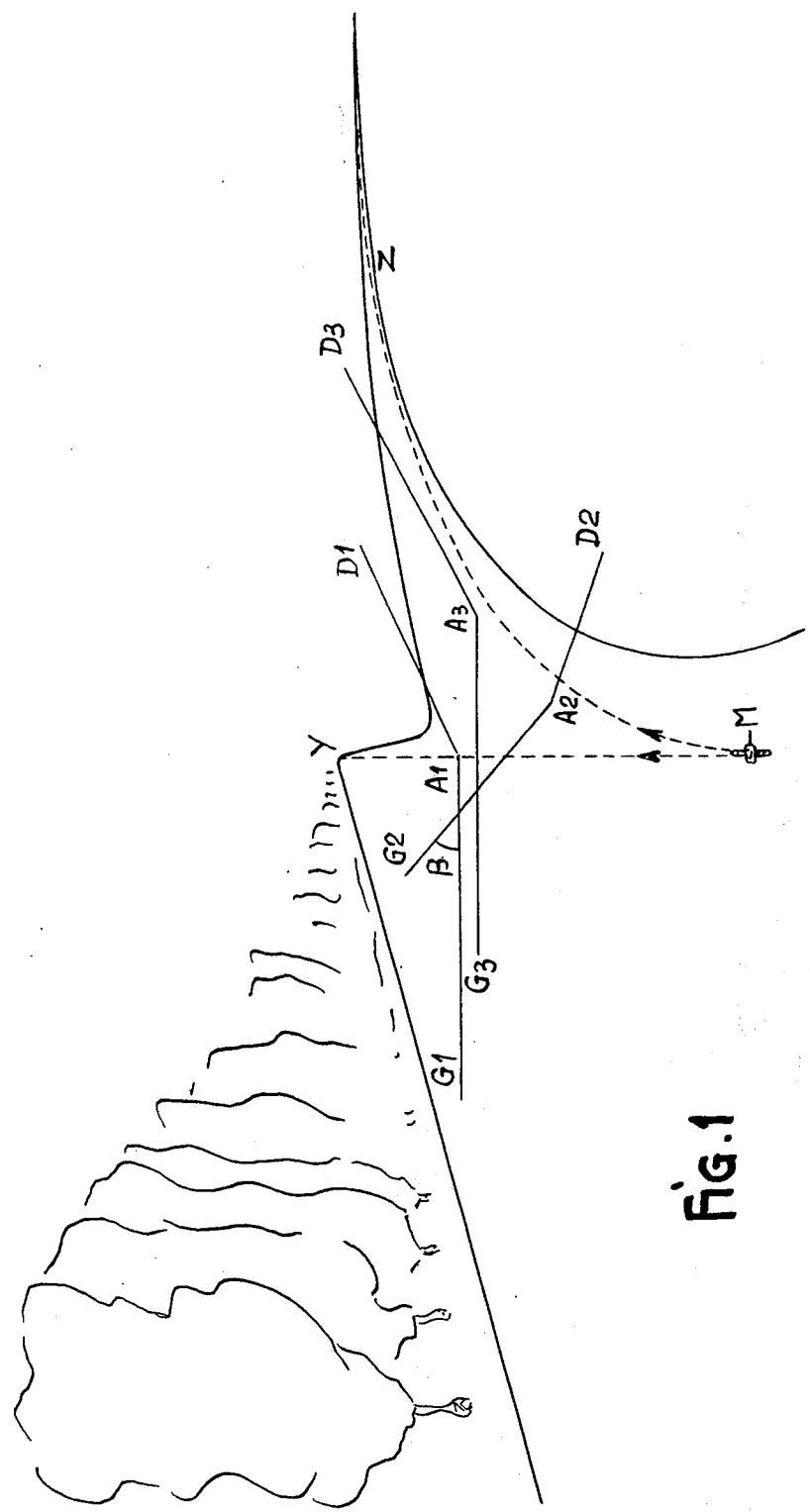
FIGS. 1, 2 and 3 are diagrams showing the behaviour of a motor-cycle when making a turn, FIG. 1 showing the lighting of the road, FIG. 2 the inclination of the motor cycle on a turn, and FIG. 3 a graph of the applied forces.

In a typical example, FIG. 1 shows the phenomena in perspective. On a straight road with right-hand traffic a motor-cycle M moving along the rectilinear path M–Y illuminates the road (with a dipped beam) with the rays of light situated beneath the cut-off limit $G_1$–$A_1$–$D_1$. Such lighting is satisfactory, the headlamp setting having been carried out for an upright vehicle. If, now, the same motor cycle M makes a turn to the right, as shown by the curved path M–Z, the cut-off limit of its beam of light becomes $G_2$–$A_2$–$D_2$. It will be seen that a beam of light of this kind is very unsatisfactory. Firstly, its range has become inadequate. Secondly, its orientation is incorrect. $G_3$–$A_3$–$D_3$ shows the optimum cut-off to be obtained for the beam of light of the motor-cycle M in the righthand turn path M–Z.

Figures 2, 3:
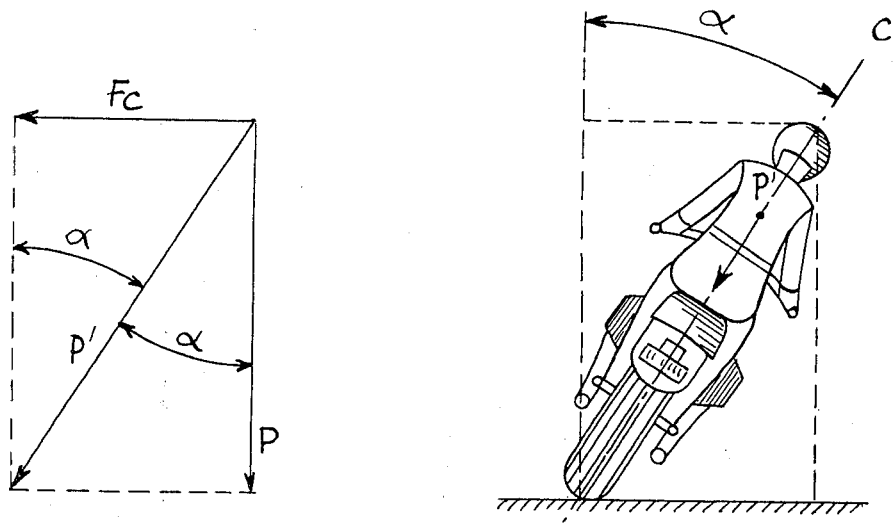

Theoretical and experimental studies have been carried out to discover the reasons for the phenomenom mentioned. It would appear finally that they are due to two main causes:

Firstly, it appears that all vehicles of the above type in contact with the road at only two points and driven at relatively high speeds of several tens of kilometers per hour, have the specific characteristic of inclining in relation to the plane of the trajectory when making turns in order to balance the effect of centrifugal force. FIG. 2 shows the behavior of a motor-cycle when making a turn. It will be seen that the central plane C—C of the vehicle is inclined by an angle $\alpha$ to the vertical, the angle $\alpha$ being a function of the centrifugal force. More accurately, as will be seem from FIG. 3, which is a force component diagram, when a weight P is subjected to the centrifugal force $F_c$, the force component P' defines the angle $\alpha$ in relation to the vertical. In practice, with standard-production motor-cycles and under normal road traffic conditions, the angle $\alpha$ may be as much as 50°. It will readily be seen that the inclination of the vehicle to the vertical is the main cause of the inadequate illumination mentioned. For example, in the case of FIG. 1, the angle $\beta$ of the two halves of the cut-off planes $A_1G_1$–$A_2G_2$ is substantially equal to $\alpha$ which corresponds to the inclination of the motor-cycle M.

From another aspect, motor-cycles are usually provided with a suspension and a variation of the suspension attitude is usually observed when the vehicle makes turns, and this is due to the effect of the centrifugal force applied to the vehicle and results in a relative displacement of the suspended part in relation to the wheels. The headlamp of such vehicles is rigidly connected to the suspended part, whether mounted on the front pivoting fork of the vehicle (the most general case), or on its frame or chassis. Under such conditions it appears that the vertical orientation of the beam of light from the headlamp follows the variations in the attitude of the suspended part, and this second phenomenon also results in a modification of the distribution of the light over the road.

Figure 5:
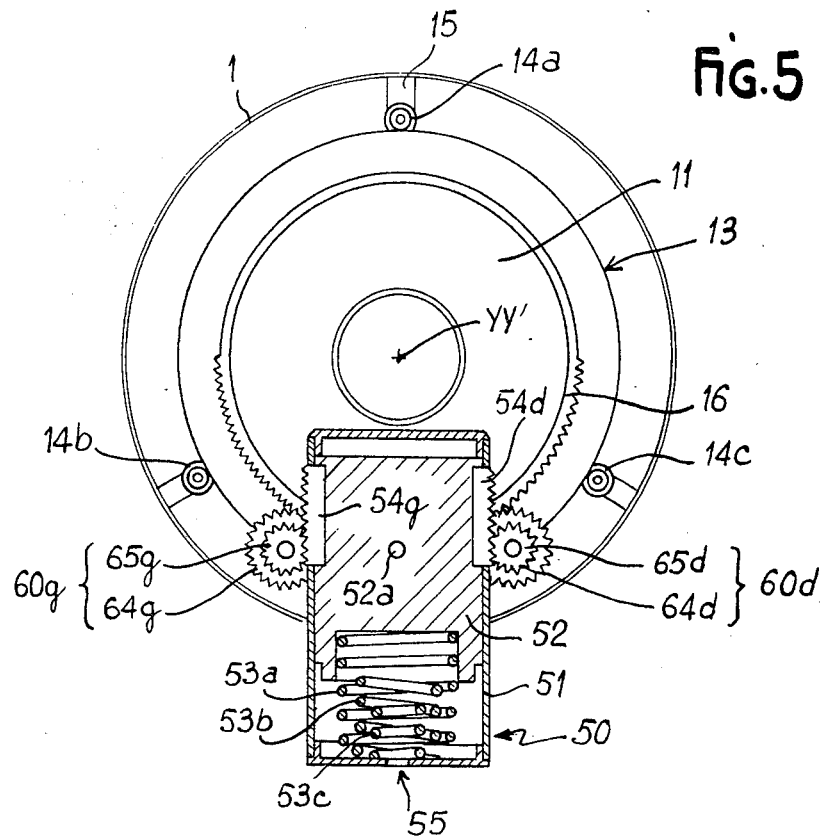
FIG. 5 is a diagrammatic view of the same system from the rear and in partial section.
Figure 4:
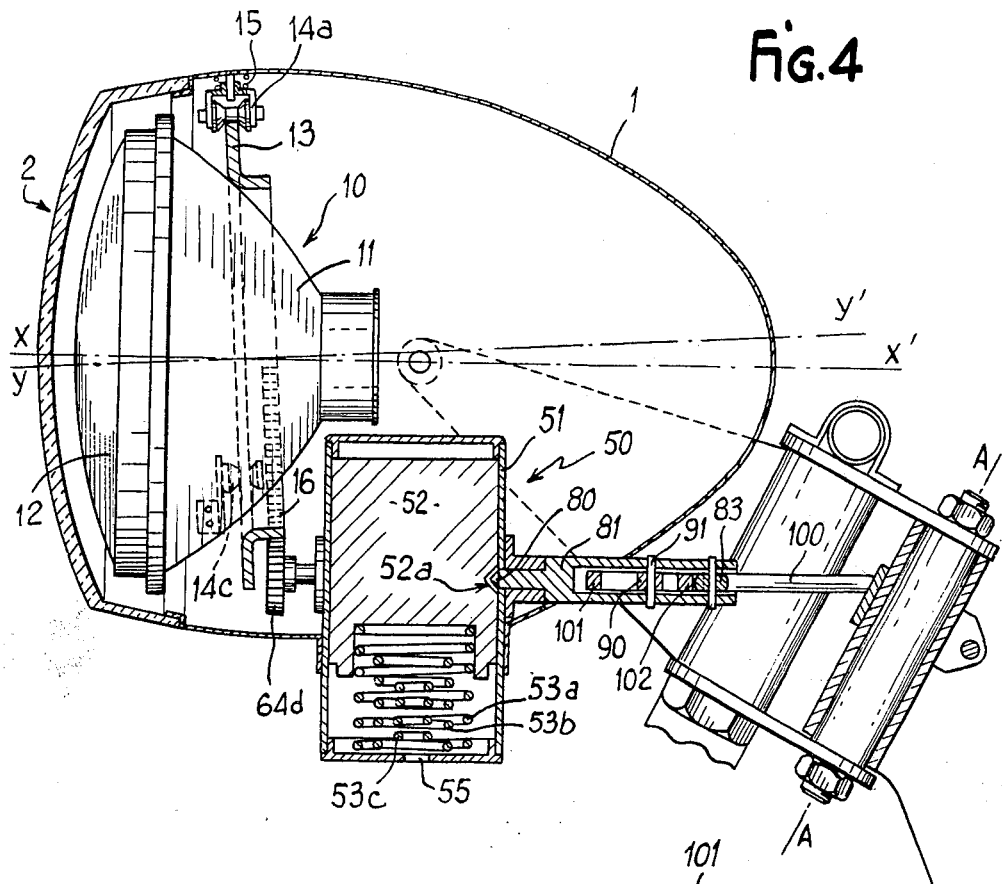
FIG. 4 is a diagrammatic side view in partial section showing a first embodiment of the system according to the invention.

Referring to FIGS. 4 and 5 a headlamp shell 1 closed at the front by a transparent lens 2 is mounted on the fork of a motor-cycle adapted to turn about an axis A—A (see FIGS. 4 and 6) in relation to its fixed frame. A sealed-beam unit 10 having an axis X–X' and comprising a reflector 11, a front lens 12 and a lamp (not shown) associated with the reflector, is mounted for rotation about an axis Y–Y' disposed in the central median plane of the headlamp passing through X–X'. The axes X–X' and Y–Y' intersect at a point advantageously situated near the light source (filament) of the sealed-beam unit, and Y–Y' is slightly inclined forwardly and downwardly in relation to X–X'. To this end, the reflector 11 bears a movable guide ring 13 lying perpendicular to Y–Y' and cooperating with three barrel-shaped rollers 14a, 14b, 14c mounted inside the shell 1. Preferably, as illustrated, the three rollers are distributed uniformly at 120° intervals in relation to the axis Y–Y'; the rollers 14b and 14c are of fixed axis and the roller 14a is mounted on a spring 15 which always tends to push it towards the axis Y–Y'.

An at least partially toothed ring 16 is also associated with the guide ring 11 and is coaxial therewith.

The transducer detector system 50 will now be described. This system comprises a substantially vertical casing 51 inside which a mass 52 (hereinafter referred to as a weight) is mounted slidably and bears on a resilient system consisting of a plurality of springs 53a, 53b, 53c. The weight 52 is connectd to two racks 54d and 54g projecting through apertures respectively situated on the right and left of the casing 51. The springs 53a, 53b, 53c, are connected in cascade so as to successively and cumulatively offer their selected resilient resistance to any movement of the weight 52 towards the base of the casing 51. Thus when the motor-cycle on whose fork the detector 50 is mounted is inclined by an angle $\alpha$ on a turn to counterbalance the centrifugal force, the racks 54d and 54g undergo a linear displacement substantially proportional to $\alpha$.

The racks 54d and 54g are designed to cooperate with a transmission chain 60d, 60g respectively which can in turn cooperate with the toothed ring 16. The chain 60d will now be described by way of example.

It is mounted so as to be slidable between two plates 70 and 71 (see FIG. 6) connected to the casing 51. It comprises essentially a rod 61d provided with two shoulders 62d and 63d adapted to abut the plate 70 and 71 respectively.

A pinion 64d is mounted at one end of the rod 61d and is adapted to cooperate with the toothed ring 16 when the rod 61d is not pushed rearwardly in the direction of the plate 71, as will be apparent hereinafter. In its central part the chain 60d comprises a gear 65d cooperating continuously with the rack 54d for any position of the rod. At its rear end the rod 61d is associated with an adjustable link 66d having a roller 67d rotatable about a pivot 68d.

The transmission chain 60g has the same structure and has the same references but with the index d amended to g.

The weight 52 is also provided with a notch 52a adapted to cooperate with a point 80 on one end of a rod 81, two springs 82 always tending to push the point 80 to the base of the notch 52a. This position is possible only when the weight 52 is in the top position corresponding to straight-line travel. When it is engaged in the aperture 52a, the point 80 locks the weight 52 in position. A support roller 83 is mounted at the end of the rod 81 remote from the point 80. The pivots 68d and 68g are connected by a link 90 articulated at 91 on the rod 81, the pivots 68d and 68g being adapted to slide in slots formed in the link 90.

All the above elements bearing the references from 60 to 91 are connected to the motor-cycle fork which is movable about the axis A—A in relation to the frame. The casing 51 is advantageously connected to the shell as shown. The two transmission chains 60d and 60g must cooperate respectively with the tooth ring 16 only for a predetermined turn situation (to left or right). Also, the weight 52 must be free to slide in the casing 51 only when the motor-cycle is effectively in a turn.

To this end, a selective disengagement system 100 is provided which is connected to the frame and comprises two circular cam tracks 101 and 102, having their centre on the axis A—A. The cam track 101 can cooperate with the two rollers 67d and 67g while the cam track 102 cooperates with the roller 83. The cam track 101 includes a central part 101a and two side parts 101b of smaller radius connected by inclines to the central part. The cam track 102 has a notch 102a to receive the roller 83.

Figure 6:
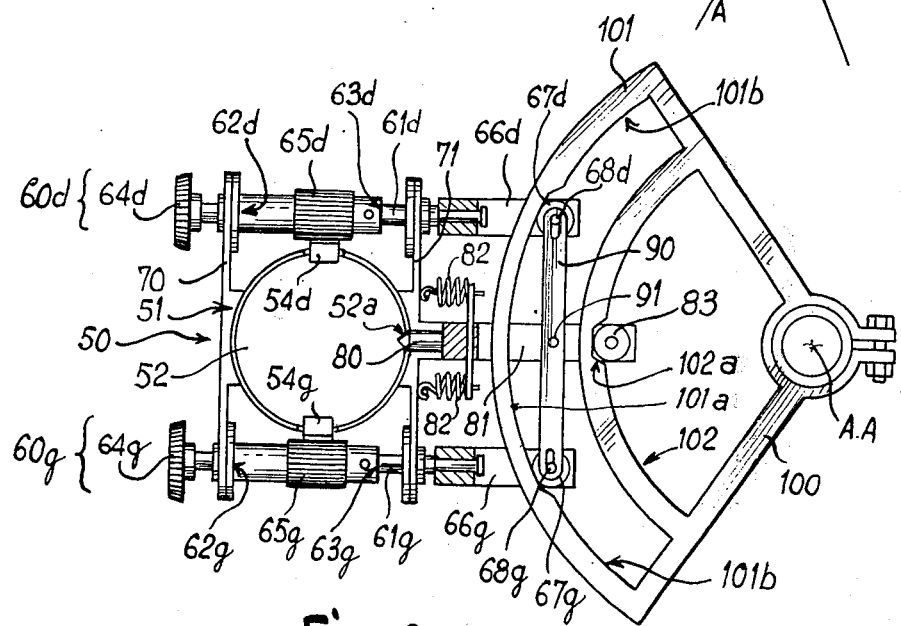
FIG. 6 is a top plan view of the transducer detector system and of the mechanical transmission system associated therewith.

When the motor cycle is travelling in a straight line, with the front wheel on the axis of the frame, the system is in the position shown in FIG. 6. The weight 52 is locked in position by the point 80. The two pinions 64d, 64g are in mesh with the toothed ring 16.

When a turn is started, all the elements 1–91 connected to the fork start to pivot about the axis A—A in relation to the elements 100–102 connected to the frame.

The first effect of this relative movement is to cause the roller 83 to leave the notch 102a. The point 80 then leaves the notch 52a, thus releasing the weight 52. The transducer detector system is thus put into operation.

The second effect of this relative movement is that one of the rollers 67d, 67g moves towards the centre of the central cam track 101a while the other engages one of the side parts 101b. The link 90 then pivots about its pivot 91. One of the transmission chains 60b and 60g remains stationary, its pinion 64d, 64g remaining in mesh with the toothed ring 16 while the other chain recedes, its pinion being disengaged from the toothed ring 16.

It will be seen that the movement of the racks transmits a rotary movement in the required direction to the optical system, the amplitude of such movement corresponding, preferably linearly, to the value of the angle $\alpha$ of the inclination of the motor-cycle when the latter is in a turn. Thus the beam of light from the headlamp is systematically corrected.

Locking of the weight 52 by the point 80 prevents any accidental operation of the system outside turns. According to an auxiliary feature of the invention, an auxiliary electromagnetic control may be used to release the point 80, such control being actuated only when the headlamp is lit; in this way the system according to the invention would remain systematically out of operation during the day time and would come into operation only when strictly necessary (when turns are made at night).

The bottom part of the casing 51 (containing the springs 53a, 53b, 53c) forms a chamber closed by the bottom part of the weight 52. A small hole 55 enables air to escape when the weight 52 descends. This system forms a pneumatic dash-pot for the movement of the weight 52.

The embodiment according to FIGS. 7–9 will now be described.

Figure 7:
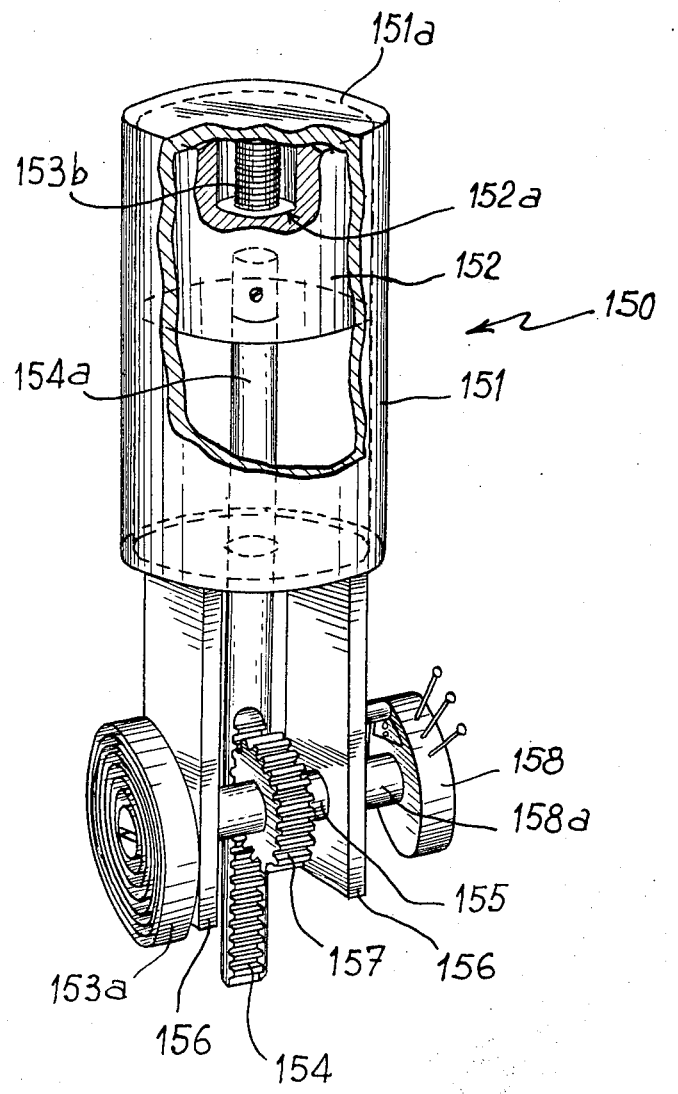
FIG. 7 is a diagrammatic perspective view of a transducer detector system coupled to a potentiometer in accordance with the second embodiment.

The transducer detector 150 in FIG. 7 comprises a substantially vertical cylindrical casing 151 inside which a weight 152 is mounted. The weight is connected to a rack 154 mounted on a rod 154a projecting through the base of the casing. A shaft 155 is mounted for rotation on a double frame 156 and a gearwheel 157 keyed on said shaft cooperates with the rack 154 so that any vertical movement of the weight 152 and of the rack 154 results in a rotary movement of the shaft 155 which forms the output member of the transducer detector 150.

A drum spring 153a is mounted between the shaft 155 and a fixed point of the frame 156 and tends, like the spring 53a, to cause the weight 152 always to move towards the top part of the cylinder 151.

In addition, a damper spring 153b (having a similar function to the spring 53b) may be housed in a recess 152a in the weight 152; said spring 153b cooperating with the top surface 151a of the cylinder 151 at the end of the upward movement of the weight 152; the effect of the springs 153a and 153b can therefore be so combined that the angle of rotation of the shaft 155 is substantially proportional to the angle $\alpha$ of inclination of the motor-cycle in a turn.

A rotary potentiometer 158 is fixed on the frame 156, its pivot 158a being connected to the shaft 155. It will readily be seen that the potentiometer 158 mounted in this way converts the value of the angle $\alpha$ into a potentiometer value. A potentiometer having a linear travel may be used without departing from the scope of the invention.

The use of the detected potentiometer value for the compensating drive of the headlamp sealed-beam unit by means of an electric motor (FIG. 9) will now be explained with reference to the circuit diagram shown in FIG. 8.

As previously was the case, the reflector 11 of the optical system 10 of the headlamp mounted inside a shell 1 is movable in respect of rotation about an axis Y—Y. To this end, as before, it preferably comprises a guide ring 13 cooperating with the rollers 14a, 14b, 14c mounted inside the shell 1. The reflector 11 of the sealed-beam unit 10 is again provided with a toothed ring 16 as in the first embodiment (FIG. 3).

Figure 9:
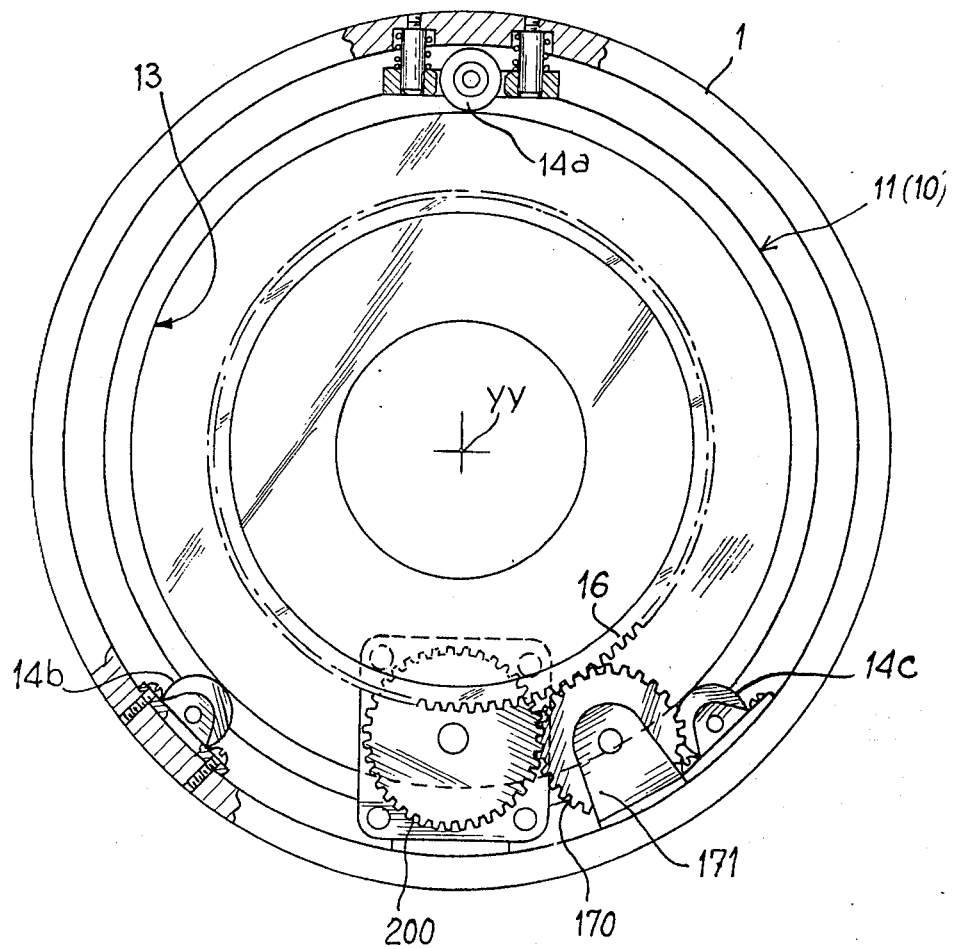
FIG. 9 is a diagrammatic rear view of the headllamp showing the rotary drive thereof.

The rotary drive of the optical system 10 of the headlamp is by means of an electric motor 200 driving the toothed ring 16 by means of a gear 170 mounted on the shell by means of an assembly yoke 171 (FIG. 9).

Rotation of the motor 200 must follow the development of the potentiometer value of the potentiometer 158, the direction of rotation of the motor depending upon the direction (left or right) of inclination of the motor-cycle handlebar.

Figure 8:
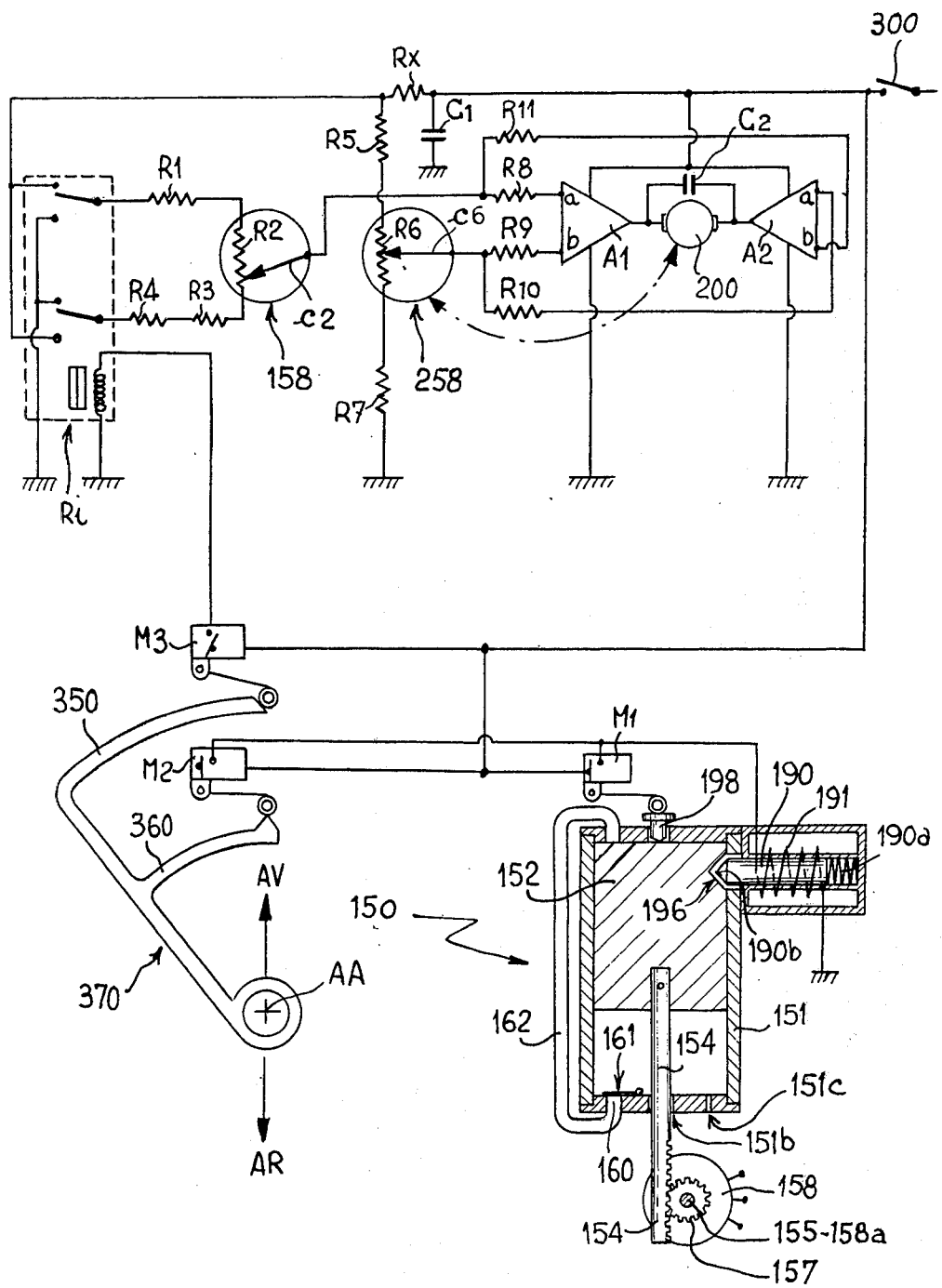
FIG. 8 diagrammatically illustrates the headlamp control circuit associated with the transducer detector system of FIG. 7.

FIG. 8 shows the control circuit used.

This Figure shows certain features of the transducer detector system 150 in greater detail. The bottom part of the cylinder 151 is formed with an aperture 160 controlled by a non-return valve 161. A connecting tube 162 connects the outlet of the value 161 to the top part of the cylinder 151 externally. A cylindrical rod 154a extends with practically no leakage through the end of the cylinder 151 via a matching aperture 151b; a small orifice 151c provides communication between the interior and exterior of the cylinder 151. On a downward movement of the weight 152 the valve 161 is closed and air escapes slowly through the orifice 151c; similarly, the top part of the cylinder 151 fills with air only very slowly under the effect of the leakage passages formed between the weight 152 and the inner wall of the cylinder 151; the descent of the weight 152 is thus damped; the upward movement of the weight 152, on the other hand, causes valve 161 to open and the bottom and top parts of the cylinder 151 to communicate via the connecting tube 162. In these conditions there is nothing to oppose the upward movement of the weight 152. Such a weight may also be mounted in the cylinder 151 by means of ball bearings to reduce friction.

Means for locking the weight 152 in its top position are also provided. Such means comprise a stud 190 resiliently urged by a spring 190a and adapted to cooperate by its point 190b with a notch 196 formed in the weight 152. The stud is formed by a ferro-magnetic core and can cooperate with an electrical winding 191 with which it forms an electromagnet. When the winding 191 is energised the stud 190 withdraws and compresses the spring 190a, thus releasing the weight 152.

The circuit operationally connecting the transducer detector 150 to the motor 200 is shown completely in FIG. 2 in which reference 300 denotes a switch controlling energization of the headlamp and preferably, but not necessarily, the motor-cycle dipped/main-beam switch which controls the electrical supply to the circuit which is thus put into operation only when the motor cycle headlamp is dipped. The d.c. supply voltage is that of the motor-cycle. Referring to FIG. 8:

R$i$ is a changeover relay;

158 is the reference potentiometer; to facilitate understanding of the invention, it is shown both in its mechanical position in cooperation with the rack 156, and in its electrical position in the electrical circuit shown in FIG. 8; the total internal resistance of the potentiometer 158 is denoted by resistance $R_2$;

258 is the rotary potentiometer for giving the position reference of the motor 200. The rotary spindle of the potentiometer 258 is connected to the spindle of the motor 200. The total internal resistance of potentiometer 258 is denoted by $R_6$;

$R_1, R_3, R_4, R_5, R_7, R_8, R_9, R_{10}, R_{11}, R_X$ are resistors;

$C_1$ and $C_2$ are capacitors;

$A_1$ and $A_2$ are amplifiers;

$M_1, M_2, M_3$ are microswitches.

The microswitch $M_1$ is controlled by a movable abutment stud 198 extending through the top part of the cylinder 151; when the weight 152 is in its top position, it pushes the stud 198 which acts on the microswitch $M_1$ to cause it to open (open circuit).

Microswitches $M_2$ and $M_3$ are controlled by two cam tracks 350 and 360 connected to a movable control segment 370 adapted to turn with the motor-cycle handlebar about the axis A—A. In FIG. 8, segment 370 is shown with the angular orientation that it has when the motor-cycle handlebar is in its mean position corresponding to straight-ahead travel.

With the cam track shape shown, it will readily be seen that the microswitch $M_2$ is open only for the middle position of the handlebar (as shown), and is closed when the handlebar is turned to the right or left. It will also be seen that the microswitch $M_3$ is open when the handlebar is turned to the left (the start of the opening position will be apparent from the Figure) and is closed when the handlebar is turned to the right.

Starting from switch 300, a first arm of the circuit enables the winding 191 to be fed both via microswitch $M_1$ and via microswitch $M_2$. In this way winding 191 is always fed except when $M_1$ and $M_2$ are open, i.e., when the weight 152 is in its top position while the handlebar is in its middle position for straight-ahead travel. In the latter case, the weight is locked. This locking naturally continues when the circuit is not supplied, i.e., when the switch 300 is open.

The arm of the circuit extending to $M_3$ serves to supply the control winding of the change-over relay R$i$: when the microswitch $M_3$ changes its state the relay changes over.

From the switch 300 the main arm of the circuit feeds the changeover relay R$i$, the two potentiometers 158 and 258 (detector potentiometer and motor position reference potentiometer respectively), and the two amplifiers $A_1$ and $A_2$.

The potentiometer 158 (total resistance $R_2$) is connected in series with $R_1$, $R_3$ and $R_4$. Potentiometer 258 (resistance $R_6$) is connected in series with $R_5$ and $R_7$. The assembly $R_1, R_2, R_4$ is fed via relay R$i$ in a direction depending on the state of changeover of the relay R$i$, i.e., the state of microswitch $M_3$. In the first state of the relay R$i$, the voltage at the slider $C_2$ of potentiometer 158 varies in a range corresponding to a resistance variation ranging from $R_1$ to $R_1 + R_2$. In the other state of relay R$i$, the voltage at slider $c_2$ varies in a range corresponding to a resistance variation ranging from $R_3 + R_4$ to $R_3 + R_4 + R_2$. The values of the resistance are so selected that the said ranges are separate and adjacent so that the voltage at the slider $c_2$ varies continuously when the motor-cycle handlebar is turned from the extreme left to the extreme right. For this $R_1$ is made equal to $R_4$ and $R_3$ is made equal to $R_2$.

The reference potentiometer 258 is given the same voltage variation band. For example, $R_6 = R_2 + R_3$ and $R_5 = R_7 = R_1 = R_4$.

The supply to the motor 200, which is a reversible d.c. motor, causes two amplifiers $A_1$ and $A_2$ to come into operation, each having a non-changeover input $a$ and a changeover input $b$.

Identical resistors $R_8$, $R_9$, $R_{10}$ and $R_{11}$ are disposed in series with each of the said inputs of the two amplifiers.

The potential difference between the slider $c_2$ (of 158) and slider $c_6$ (of 258) is applied to the amplifier $A_1$ via resistors $R_8$ and $R_9$. This same potential difference is also applied, but with an opposite sign, to amplifier $A_2$ via resistors $R_{10}$ and $R_{11}$. In other words, the amplifiers $A_1$, $A_2$ are connected similarly but with a change of their non-changeover and changeover inputs.

The capacitors $C_1$ and $C_2$ are smoothing capacitors which eliminate interference and excess voltage defects, particularly switching surge voltages. $R_X$ is a load resistor.

The outputs of the two amplifiers $A_1$ and $A_2$ are fed to the two terminals of the d.c. motor 200, which rotates in either direction as long as there is a potential difference between $C_2$ and $C_6$. As it moves, motor 200 drives potentiometer 258 and stops when the two potentiometers are in equilibrium. The optical system 10 of the headlamp has then undergone an orientation correction corresponding to the potentiometer value detected at 158, i.e. corresponding to the angle of inclination $\alpha$ of the motor-cycle.

Of course the present invention is not limited to embodiments described and illustrated, which are only examples.

More particularly, the correction system may be used in combination with a vertical control system operating in dependence upon the vehicle attitude, of any type known per se, particularly for motor vehicles, a vertical adjustment system of this kind being adapted to control the optical system or the shell of the headlamp by adding its movement to the corrective rotation according to the invention. In that case, for example, the headlamp shell is mounted to pivot about a substantially horizontal axis. The system according to the invention is applicable to any type of motor-cycle, whether or not its headlamp is connected to the front fork of the vehicle. It may be used equally well for correcting main-beam lighting and dipped-beam lighting.

What I claim as my invention and desire to secure by Letters Patent is:

1. A headlight for use with a two-wheeled vehicle, such as a motorcycle, having a body and handlebars pivotable with respect to the body, the headlight comprising:
   a frame fixed with respect to the handlebars of the vehicle
   light-projecting means carried by said frame, said light projecting means having an optical axis along which light is projected therefrom,
   support means for rotatably supporting said light-projecting means with respect to said frame, said light-projecting means being rotatable about an axis extending in a front-to-rear direction of said light-projecting means and at a small acute angle to said optical axis, and
   means operative when the vehicle makes a turn for rotating said light-projecting means about its axis of rotation from the position it occupies when the vehicle is upright and traveling in a straight line, the amount of rotation at any moment being a function of the angle of inclination which the vehicle makes at that moment with the vertical.

2. A headlight according to claim 1 wherein the axis of rotation of said light-projecting means is in the same vertical plane which contains said optical axis, and said axis of rotation is inclined forwardly and downwardly with respect to said optical axis.

3. A headlight according to claim 1 wherein said support means for said light-projecting means comprises a guide ring mounted on said frame for rotation about said axis of rotation and said means for rotating said light-projecting means includes gear teeth carried by said guide ring and a driving pinion meshing with said gear teeth.

4. A headlight according to claim 1 wherein said operative means is responsive to the centrifugal force produced when the vehicle makes a turn.

5. A headlight according to claim 4 wherein said operative means includes a weight slidably mounted with respect to said frame, and resilient means for resisting the movement of said weight under the influence of centrifugal force.

6. A headlight according to claim 5 including locking means for maintaining said weight against movement when the vehicle is traveling along a straight path.

7. A headlight according to claim 5 including a rack movable linearly with said weight, and wherein said resilient means resist movement of said weight in a manner such that the distance through which said rack moves is proportional to the centrifugal force applied to said weight during a turn of the vehicle.

8. A headlight according to claim 5 including two racks movable linearly with said weight, and wherein said means for rotating said light-projecting means includes a transmission cooperable with each of said racks, and means for disengaging one of said transmissions when the vehicle makes a turn.

9. A headlight according to claim 8 wherein said disengaging means includes an arcuate cam fixed with respect to the vehicle body, the center of curvature of said cam lying on the pivot axis of the vehicle handlebars, and a pair of follower rollers engaging said cam, each of said follower rollers being allocated to one of said transmissions.

10. A headlight according to claim 9 including an additional arcuate cam fixed with respect to the vehicle body, the center of curvature of said additional cam lying on the pivot axis of the vehicle handlebars, locking means for maintaining said weight against movement when the vehicle is traveling along a straight path, and means for releasing said locking means when the vehicle handlebars are turned, said releasing means including a follower roller engaging said additional cam.

11. A headlight according to claim 1 wherein said operative means includes a potentiometer, means for adjusting the value of said potentiometer in accordance with the degree of inclination of the vehicle, a motor, and electric circuit means for rotating said motor an amount dependent upon the adjustment of said potentiometer.

12. A headlight according to claim 11 wherein said motor is a reversible D.C. motor, and including means responsive to the direction in which the vehicle handlebars turn for determining the direction of rotation of said motor.

13. A headlight according to claim 12 including a reference potentiometer arranged to be adjusted by said motor, and wherein said means for rotating said motor comprises an electric circuit including both of said potentiometers and means for energizing said motor until said potentiometers reach equilibrium.

14. A headlight according to claim 11 including a member pivotable with the vehicle handlebars, and switch means operable by said member for changing the polarity of said potentiometer.

15. A headlight according to claim 11 including a switch for shifting said headlight between a main beam and a dipped beam, and means responsive to said switch for controlling the power supply to said electric circuit means.

16. A headlight according to claim 11 wherein said operative means includes a weight slidably mounted with respect to said frame, locking means for maintaining said weight against movement when the vehicle is traveling along a straight path, and electromagnetic means responsive to turning of the vehicle handlebars for releasing said locking means.

17. A headlight according to claim 16 including a circuit having a switch for controlling energization of said electromagnetic means, and a member pivotable with the vehicle handlebars for operating said switch.

18. A headlight according to claim 17 including an auxiliary switch for controlling energization of said electromagnetic means, said switch being operable in response to the presence or absence of said weight in the position it occupies when not acted upon by centrifugal force.

* * * * *